(12) United States Patent
Neumann

(10) Patent No.: US 9,036,987 B2
(45) Date of Patent: May 19, 2015

(54) BEARING ARRANGEMENT INNER RACE HEATER

(71) Applicant: General Electric Company, Schenectady, NY (US)

(72) Inventor: Ulrich Werner Neumann, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 13/828,100

(22) Filed: Mar. 14, 2013

(65) Prior Publication Data

US 2014/0270737 A1   Sep. 18, 2014

(51) Int. Cl.
| | | |
|---|---|---|
| *F21V 7/00* | (2006.01) | |
| *G02B 17/00* | (2006.01) | |
| *H05B 3/00* | (2006.01) | |
| *F16C 35/06* | (2006.01) | |
| *F16C 41/00* | (2006.01) | |
| *F16C 33/58* | (2006.01) | |
| *F16C 33/30* | (2006.01) | |
| *F16C 43/08* | (2006.01) | |

(52) U.S. Cl.
CPC ............ *H05B 3/0061* (2013.01); *F16C 35/061* (2013.01); *F16C 35/062* (2013.01); *F16C 41/00* (2013.01); *F16C 33/581* (2013.01); *F16C 33/586* (2013.01); *F16C 2360/31* (2013.01); *F16C 33/30* (2013.01); *F16C 43/086* (2013.01)

(58) Field of Classification Search
None
See application file for complete search history.

(56) References Cited

U.S. PATENT DOCUMENTS

| | | | | | |
|---|---|---|---|---|---|
| 2,042,855 | A | * | 6/1936 | Merklein | 99/422 |
| 2,054,669 | A | * | 9/1936 | Bunzl | 392/427 |
| 2,505,200 | A | * | 4/1950 | Paige | 219/474 |
| 2,748,247 | A | * | 5/1956 | Kozbelt | 392/427 |
| 3,427,434 | A | * | 2/1969 | Gassaway | 219/385 |
| D215,093 | S | * | 9/1969 | Cone | D15/144.1 |
| 3,805,019 | A | * | 4/1974 | Gorishek | 392/420 |
| 4,119,834 | A | * | 10/1978 | Losch | 392/418 |
| 4,581,520 | A | * | 4/1986 | Vu et al. | 392/420 |
| D303,832 | S | * | 10/1989 | Cone | D23/336 |
| 6,400,899 | B1 | * | 6/2002 | Chatterjee et al. | 392/418 |
| 6,775,472 | B2 | * | 8/2004 | Bakker et al. | 392/411 |
| 6,810,205 | B2 | | 10/2004 | Kaplanis et al. | |
| 7,013,080 | B1 | | 3/2006 | Kaplanis et al. | |
| 8,129,662 | B2 | | 3/2012 | Cameron et al. | |
| 8,761,588 | B2 | * | 6/2014 | Lee | 392/418 |
| 2002/0118961 | A1 | * | 8/2002 | Choi | 392/422 |
| 2003/0128972 | A1 | * | 7/2003 | Choi | 392/428 |
| 2009/0004032 | A1 | * | 1/2009 | Kaupert | 417/365 |
| 2011/0226757 | A1 | * | 9/2011 | David et al. | 219/635 |
| 2013/0247657 | A1 | * | 9/2013 | Sumitani et al. | 73/146 |

OTHER PUBLICATIONS

The Timken Company, "Industrial Bearing Maintenance Manual," 2008, 157 pages, retrieved from: http://www.timken.com/en-us/products/Documents/Industrial-Bearing-Maintenance-Manual.pdf.

* cited by examiner

*Primary Examiner* — Thor Campbell
(74) *Attorney, Agent, or Firm* — Ernest G. Cusick; Hoffman Warnick LLC

(57) ABSTRACT

A device for heating a bearing race mounted on a shaft including a quartz halogen lamp for heating the bearing race and a reflector for reflecting heat from the quartz halogen lamp towards the bearing race.

20 Claims, 5 Drawing Sheets

BEARING ARRANGEMENT INNER RACE HEATER

FIELD OF THE INVENTION

This invention relates generally to inner races of bearing arrangements and more particularly to a heater for an inner race of a bearing arrangement.

BACKGROUND OF THE INVENTION

A bearing arrangement mounted on a shaft may include an angular contact bearing or a roller bearing. Further, more than one bearing may be mounted on the shaft. For example, on an intermediate shaft of a wind turbine, the roller bearing may be placed on an upwind side followed by the angular contact bearing downwind from the roller bearing. FIG. 1 shows a cross-sectional view of a shaft 102 with the roller bearing 104 and the angular contact bearing 106. A person of ordinary skill in the art will readily recognize that there are many known bearing arrangements. Generally, each known bearing arrangement has an inner race attached to the shaft 102, a rolling element, and an outer race.

The roller bearing 104 may include a roller bearing inner race 108, a roller 110, and a roller bearing outer race 112. The roller bearing inner race 108 may be of a unitary and cylindrical form. The roller 110 fits over the roller bearing inner race 108. The roller bearing outer race 112 may be unitary and cylindrical. The roller bearing outer race 112 may include a track 114 for receiving the roller 110 and holding the roller 110 in place.

The angular contact bearing 106 may be separated from the roller bearing 104 by a spacer ring 116. The angular contact bearing 106 may include a first angular contact inner race 118 and a second angular contact inner race 120, a row of ball bearings 122, and an angular contact outer race 124. The first angular contact inner race 118 may be cylindrical with a first hemi-spherical track 126 to receive the row of ball bearings 122. The second angular contact inner race 120 may be cylindrical with a second hemi-spherical track 128 to receive the row of ball bearings 122. The first and the second angular contact inner races 118, 120 may be placed on the shaft 102 with the first and the second hemi-spherical tracks 126, 128 facing each other for receiving the row of ball bearings 122 thereby holding the row of ball bearings 122. The angular contact outer race 124 may be cylindrical with a hemi-spherical track 130 to receive the row of ball bearings 122 and hold the row of ball bearings 122 in place. A locking pin 132 may be included for preventing the angular contact outer race 124 from spinning within the housing. A plurality of lock nuts 134 may hold the first and second angular contact inner races 118, 120, the spacer ring 116 and the roller bearing inner race 108 in place in the axial direction. A shaft cover 136 may enclose the end of the shaft 102.

The installation of the roller bearing inner race 108 and the first and the second angular contact inner races 118, 120 may be interference fits to the shaft 102. In order to install them, each of the roller bearing inner race 108 and the first and the second angular contact inner races 118, 120 has to be heated to an appropriate temperature such that it grows in diameter just enough to safely install it onto the shaft 102 at its appropriate place. When allowed to cool, the roller bearing inner race 108 and the first and the second angular contact inner races 118, 120 do become adhered to the shaft 102 with a considerable holding force. In order to repair or service the angular contact bearing 106, the roller bearing 104, the shaft 102, or any other components of a machine connected to the shaft 102, it may be necessary to remove the roller bearing inner race 108 and the first and the second angular contact inner races 118, 120. Currently, removing the roller bearing inner race 108 or the first or second angular contact races 118, 120 typically employs the application of an acetylene torch to heat and expand these components. This, of course, requires a great deal of skill and includes significant attendant risks, such as fire and explosion.

BRIEF DESCRIPTION OF THE INVENTION

A first aspect of the invention provides a device for heating an inner race of a bearing arrangement mounted on a shaft, comprising: a quartz halogen lamp for heating the inner race; and a reflector for reflecting heat from the quartz halogen lamp towards the inner race.

A second aspect of the invention provides a device for heating a first angular contact inner race or a second angular contact inner race of an angular contact ball bearing mounted on a shaft, comprising: a substantially ring shaped quartz halogen lamp having an exposure to the first angular contact inner race or the second angular contact inner race; a reflector attached to the quartz halogen lamp for reflecting heat from the quartz halogen lamp towards the first angular contact inner race or the second angular contact inner race; and a housing for enclosing the quartz halogen lamp and the reflector.

A third aspect of the invention provides a device for heating a roller bearing inner race of a roller bearing mounted on a shaft, comprising: at least one substantially ring shaped quartz halogen lamp having an exposure to the roller bearing inner race, wherein the exposure is directed radially to the shaft; a reflector attached to the at least one quartz halogen lamp for reflecting heat from the quartz halogen lamp towards the roller bearing inner race; and a housing for enclosing the quartz halogen lamp and the reflector.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

The above and other aspects, features and advantages of the invention will be better understood by reading the following more particular description of the invention in conjunction with the accompanying drawings.

Figure 1:
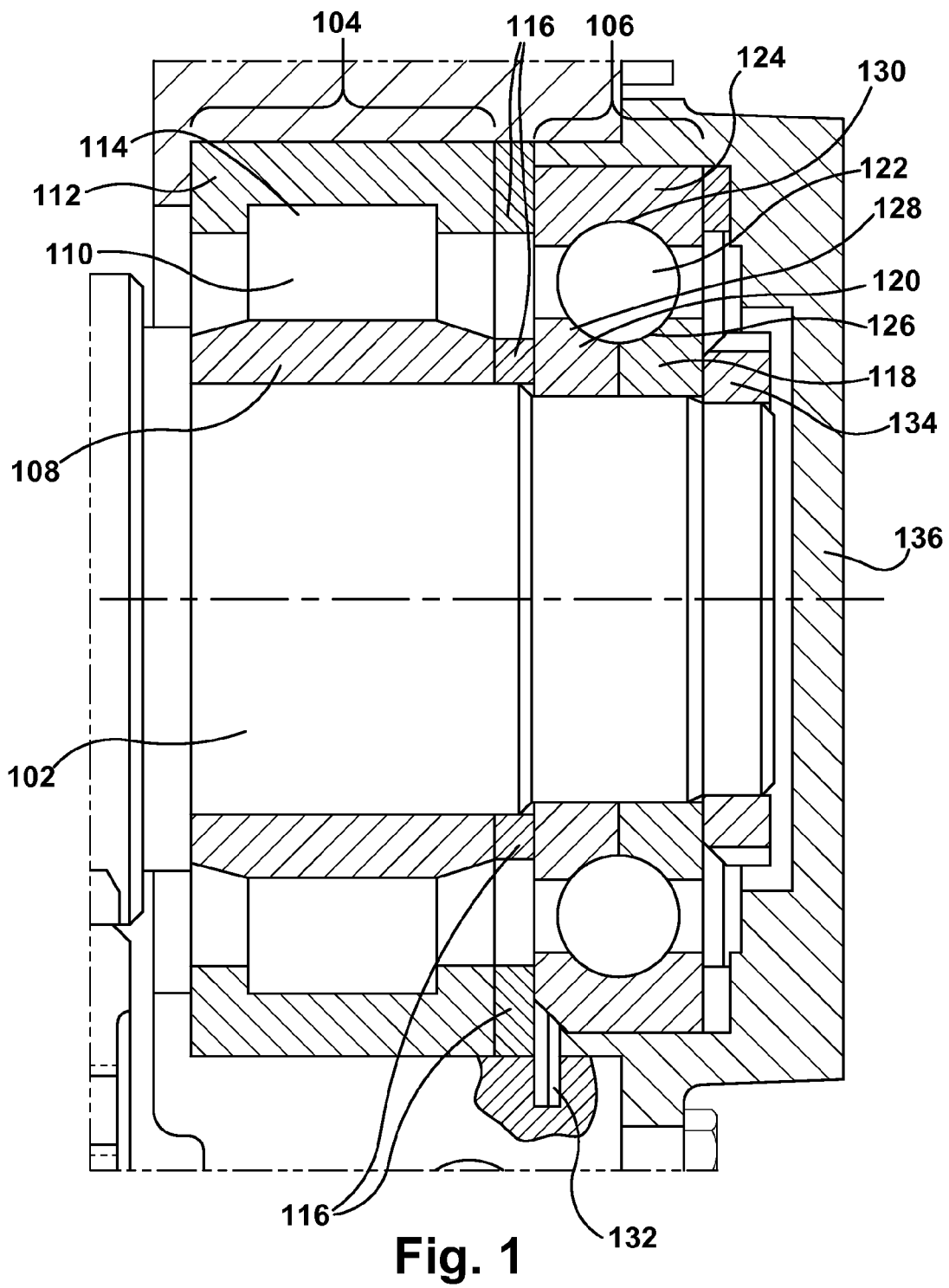
FIG. 1 shows a cross-section view of a known shaft with a roller bearing and an angular contact bearing.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 2:
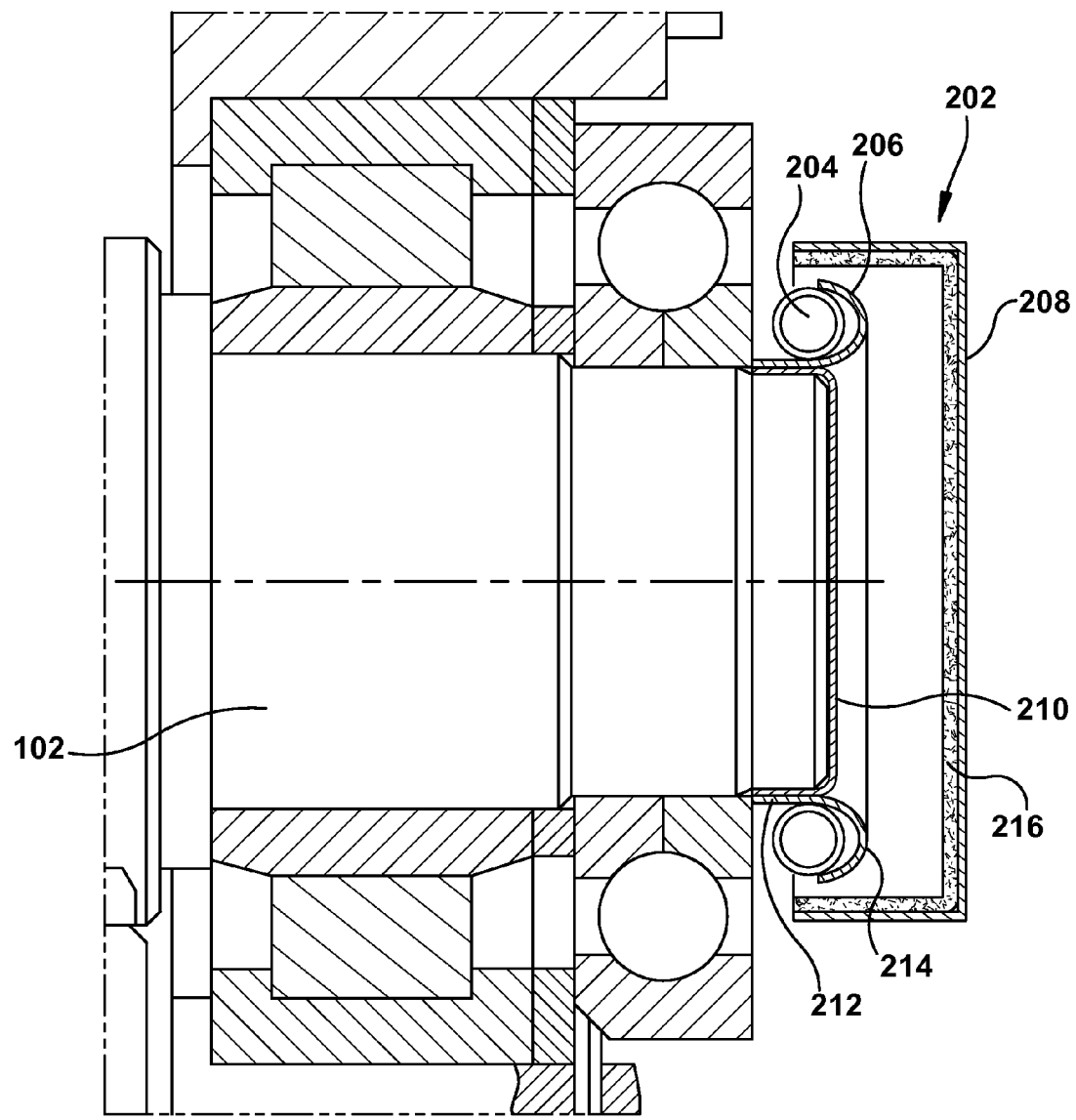
FIG. 2 shows a cross-section view of a device for heating a first angular contact inner race or a second angular contact inner race of an angular contact ball bearing in accordance with the present invention.
Figure 3:
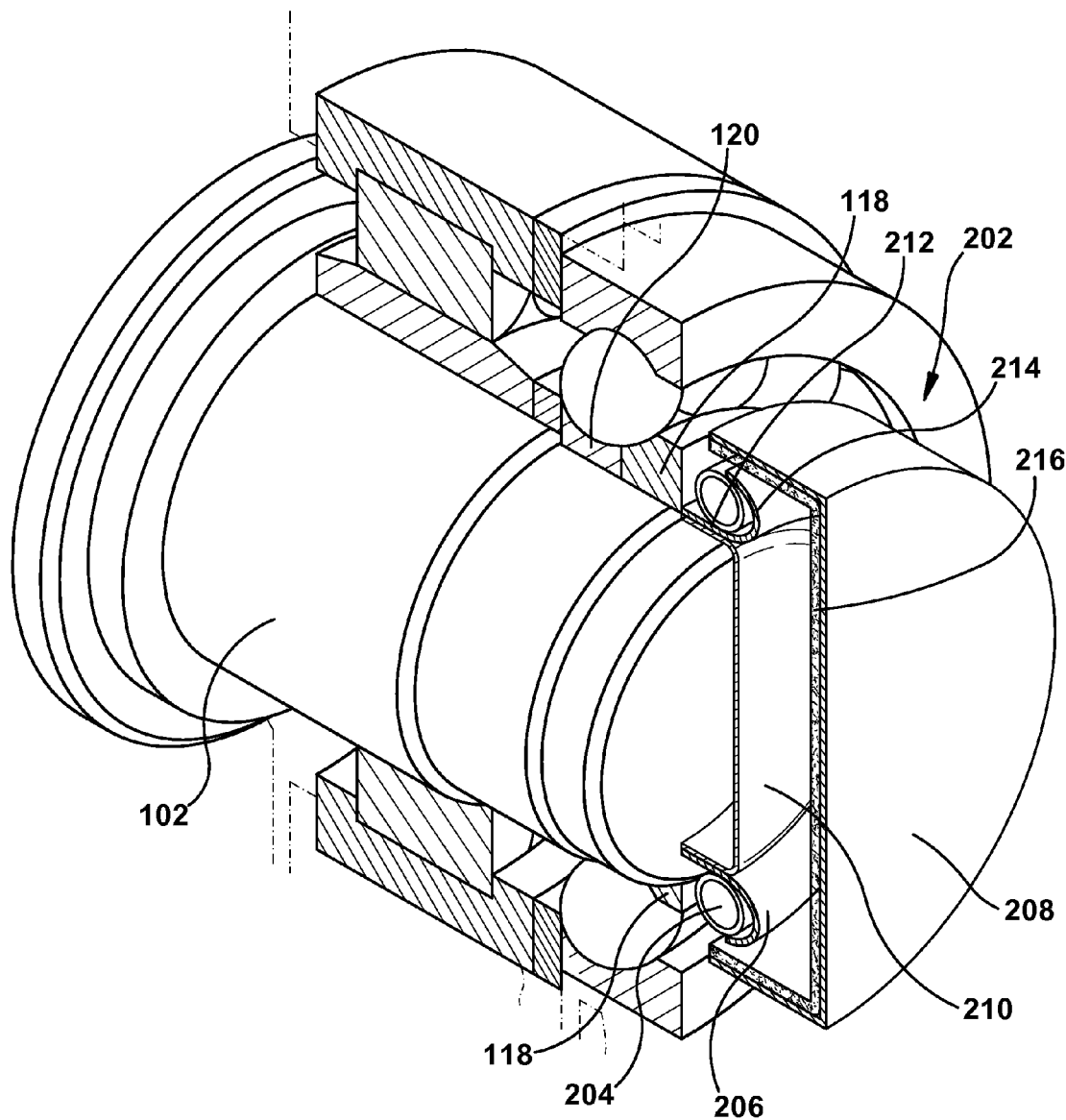
FIG. 3 shows a perspective view of a device for heating a first angular contact inner race or a second angular contact inner race of an angular contact ball bearing in accordance with the present invention.

Referring to FIG. 2 and FIG. 3, cross-sectional and perspective views, respectively, are shown of one embodiment of a device for heating a first angular contact inner race or a second angular contact inner race of an angular contact ball bearing mounted on a shaft 202. The device for heating the first angular contact inner race or the second angular contact inner race of an angular contact ball bearing mounted on a shaft 202 may include a substantially ring shaped quartz halogen lamp 204 having an exposure to the first angular contact inner race 118 or the second angular contact inner race 120, a reflector 206 attached to the quartz halogen lamp 204 for reflecting heat from the quartz halogen lamp 204 towards the first angular contact inner race 118 or the second angular contact inner race 120, and a housing 208 for enclosing the quartz halogen lamp 204 and the reflector 206. A lamp diameter of the quartz halogen lamp 204 may substantially match an inner race diameter. The device 202 may further include a sleeve 210 for covering the shaft 102. The sleeve 210 may be attached to the reflector 206 for holding the quartz halogen lamp 204 over the first angular contact inner race 118 or the second angular contact inner race 120. The sleeve 210 may include a first thermally non-conductive material. The first thermally non-conductive material may include ceramic, fiberglass, asbestos, stainless steel, epoxy composite, and/or phenolic plastic. The reflector 206 may include an inner ring 212 that extends axially to the shaft 102 for reflecting heat away from the shaft 102. The reflector 206 may include an outer ring 214 that extends radially to the shaft 102. The outer ring 214 may semi-circumferentially cover the quartz halogen lamp 204. The reflector 206 may include a thermally reflective material. The thermally reflective material may include glass with a mirror coating or metal. The device 202 may further include insulation 216 between the housing 208 and the reflector 206 for insulating the quartz halogen lamp 204. The insulation may include a second thermally non-conductive material. The second thermally non-conductive material may include ceramic, fiberglass, asbestos, stainless steel, epoxy composite, and/or phenolic plastic.

Figure 4:
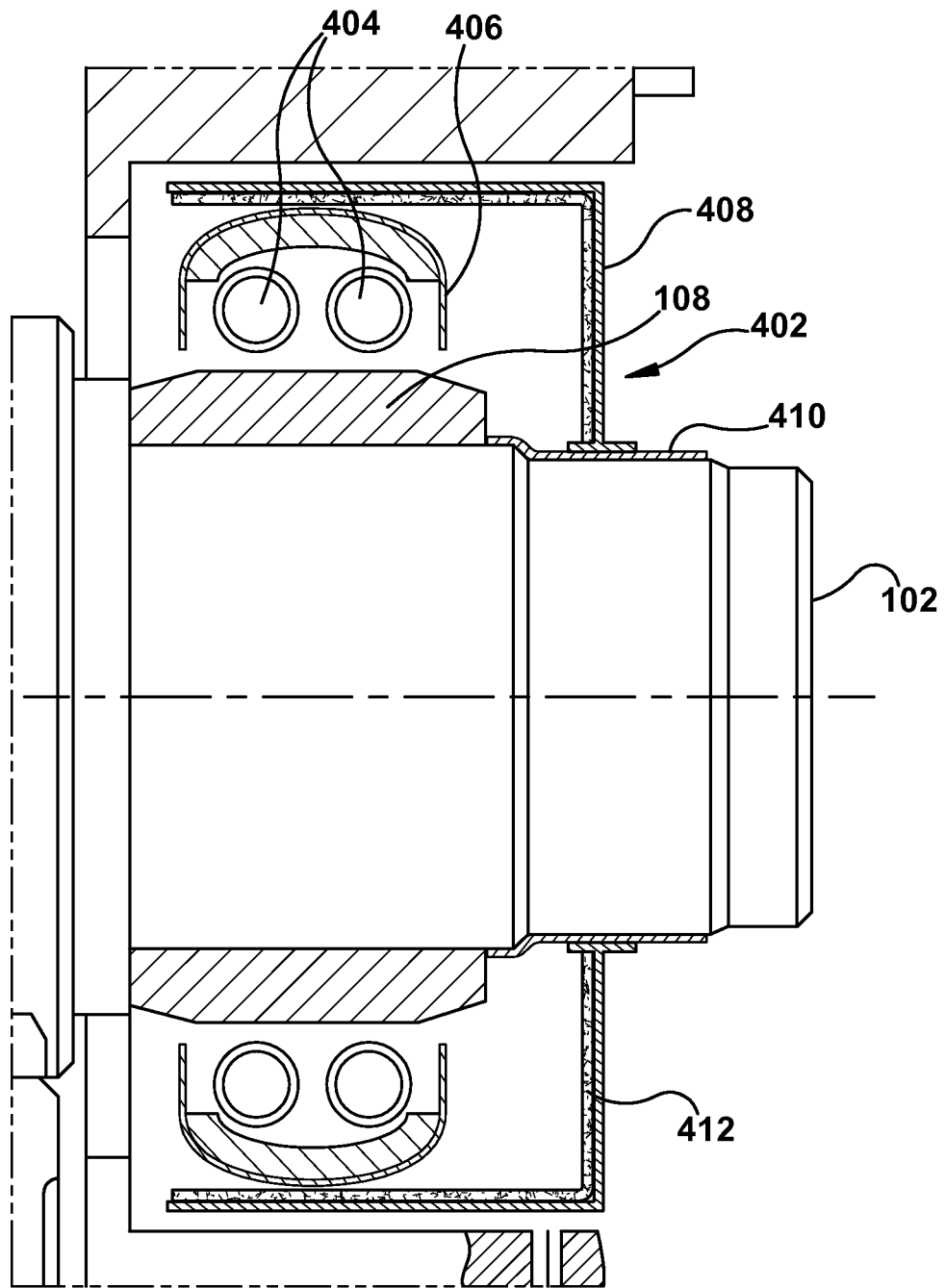
FIG. 4 shows a cross-section view of a device for heating a roller bearing inner race of a roller bearing in accordance with the present invention.
Figure 5:
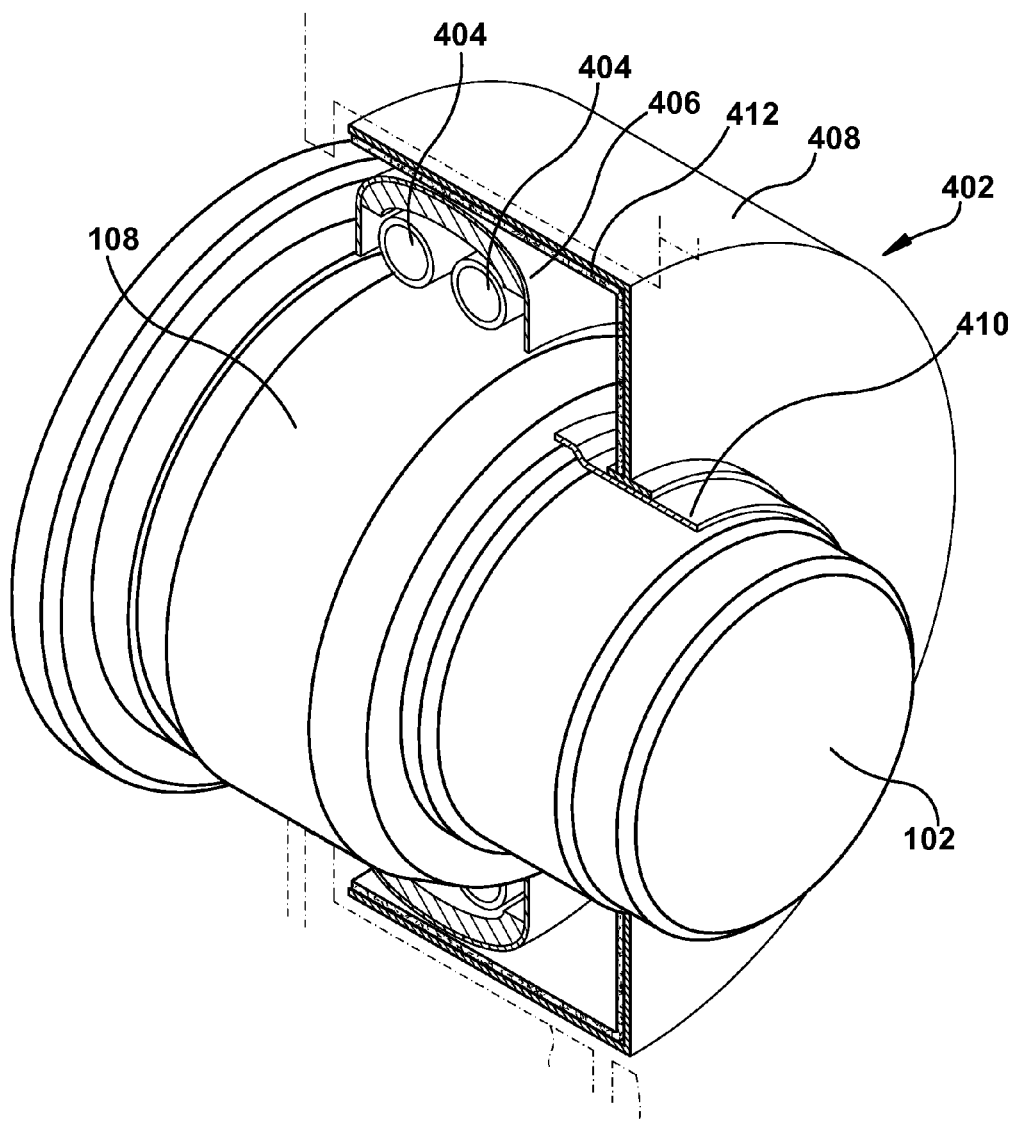
FIG. 5 shows a perspective view of a device for heating a roller bearing inner race of a roller bearing in accordance with the present invention.

Referring to FIG. 4 and FIG. 5, cross-sectional and perspective views, respectively, are shown of one embodiment of a device for heating a roller bearing inner race of a roller bearing mounted on a shaft 402. The device may include at least one substantially ring shaped quartz halogen lamp 404 having an exposure to the roller bearing inner race 108, wherein the exposure is directed radially to the shaft 102, a reflector 406 attached to the at least one quartz halogen lamp 404 for reflecting heat from the quartz halogen lamp 404 towards the roller bearing inner race 108, and a housing 408 for enclosing the quartz halogen lamp 404 and the reflector 406. The exposure may be directed radially to the shaft 102. The reflector 406 may semi-circumferentially cover the at least one quartz halogen lamp 404. The reflector 406 may cover the shaft 102. The device 402 may further include a sleeve 410 for covering the shaft 102. The sleeve 410 may be attached to the reflector 404 for holding the at least one quartz halogen lamp 404 over the roller bearing inner race 108. The sleeve 410 may include a first thermally non-conductive material. The first thermally non-conductive material may include ceramic, fiberglass, asbestos, stainless steel, epoxy composite, and/or phenolic plastic. The reflector 406 may include a thermally reflective material. The thermally reflective material may include glass with a mirror coating or metal. The housing 408 may include an opening for receiving an end of the shaft 102. The device 402 may further include insulation 412 between the reflector 406 and the at least one quartz halogen lamp 404. The insulation 412 may include a second thermally non-conductive material. The second thermally non-conductive material may include ceramic, fiberglass, asbestos, stainless steel, epoxy composite, and/or phenolic plastic.

The embodiments described above and shown at FIGS. 2-5 more specifically describe a broader embodiment of a device for heating an inner race of a bearing arrangement mounted on the shaft. The device may include a quartz halogen lamp for heating the inner race and a reflector for reflecting heat from the quartz halogen lamp towards the inner race. The device may further include a housing for enclosing the quartz halogen lamp and the reflector. The quartz halogen lamp may be substantially ring shaped. A lamp diameter of the quartz halogen lamp may substantially match an inner race diameter. The device may further include a sleeve for protecting the shaft. The sleeve may include a first thermally non-conductive material. The first thermally non-conductive material may include ceramic, fiberglass, asbestos, stainless steel, epoxy composite, and/or phenolic plastic. The reflector may include a thermally reflective material. The thermally reflective material may include glass with a mirror coating or metal. The device may further include insulation between the housing and the reflector for insulating the quartz halogen lamp. The insulation may include a second thermally non-conductive material. The second thermally non-conductive material may include ceramic, fiberglass, asbestos, stainless steel, epoxy composite, and/or phenolic plastic.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A device for heating an inner race of a bearing arrangement mounted on a shaft, comprising:
   a substantially ring-shaped quartz halogen lamp for heating the inner race;
   a substantially ring-shaped reflector open to the quartz halogen lamp for reflecting heat axially with respect to the shaft from the quartz halogen lamp towards the inner race and for reflecting heat away from the shaft; and a cylindrical sleeve inside the substantially ring-shaped reflector for mounting the substantially ring-shaped reflector on the shaft, wherein the cylindrical sleeve includes a thermally non-conductive material.

2. The device of claim 1, further comprising:
a housing for enclosing the quartz halogen lamp and the reflector.

3. The device of claim 1, wherein the quartz halogen lamp is substantially ring-shaped.

4. The device of claim 3, wherein the diameter of the quartz halogen lamp substantially matches a diameter of the inner race.

5. The device of claim 1, further comprising:
a sleeve for protecting the shaft.

6. The device of claim 5, wherein the sleeve includes a first thermally non-conductive material.

7. The device of claim 1, wherein the reflector includes a thermally reflective material.

8. The device of claim 1, further comprising:
insulation between the housing and the reflector for insulating the quartz halogen lamp.

9. The device of claim 8, wherein the insulation includes a second thermally non-conductive material.

10. A device for heating a first angular contact inner race or a second angular contact inner race of an angular contact ball bearing mounted on a shaft, comprising:
a substantially ring-shaped quartz halogen lamp having an exposure to the first angular contact inner race or the second angular contact inner race;
a substantially ring-shaped reflector open to the quartz halogen lamp and attached to the quartz halogen lamp for reflecting heat axially with respect to the shaft from the quartz halogen lamp towards the first angular contact inner race or the second angular contact inner race and for reflecting heat away from the shaft;
a cylindrical sleeve inside the substantially ring-shaped reflector for mounting the substantially ring-shaped reflector on the shaft, wherein the cylindrical sleeve includes a thermally non-conductive material; and
a housing for enclosing the quartz halogen lamp and the reflector.

11. The device of claim 10, further comprising:
a sleeve covering a shaft, the sleeve attached to the reflector for holding the quartz halogen lamp over the first angular contact inner race or the second angular contact inner race.

12. The device of claim 11, wherein the reflector reflects heat away from the shaft.

13. The device of claim 11, wherein the reflector includes an inner ring that extends axially to the shaft for reflecting heat away from the shaft.

14. The device of claim 11, wherein the reflector includes an outer ring that extends radially to the shaft.

15. The device of claim 14, wherein the outer ring semi-circumferentially covers the quartz halogen lamp.

16. A device for heating a roller bearing inner race of a roller bearing mounted on a shaft, comprising:
at least one substantially ring-shaped quartz halogen lamp having an exposure to the roller bearing inner race, wherein the exposure is directed radially to the shaft;
a substantially ring-shaped reflector open to the quartz halogen lamp and attached to the at least one quartz halogen lamp for reflecting heat radially with respect to the shaft from the at least one quartz halogen lamp towards the roller bearing inner race;
a cylindrical sleeve inside the substantially ring-shaped reflector for mounting the substantially ring-shaped reflector on the shaft, wherein the cylindrical sleeve includes a thermally non-conductive material; and
a housing for enclosing the at least one quartz halogen lamp and the reflector.

17. The device of claim 16, wherein the reflector semi-circumferentially covers the at least one quartz halogen lamp.

18. The device of claim 17, wherein the reflector covers the shaft.

19. The device of claim 17, wherein the housing includes an opening for receiving an end of the shaft.

20. The device of claim 17, further comprising:
insulation between the reflector and the at least one quartz halogen lamp.

* * * * *